United States Patent
Morwing et al.

(10) Patent No.: US 9,111,139 B2
(45) Date of Patent: *Aug. 18, 2015

(54) METHOD AND APPARATUS FOR ON-TOP WRITING

(71) Applicant: NUANCE COMMUNICATIONS INC., Burlington, MA (US)

(72) Inventors: Lars Jonas Morwing, Malmö (SE); Jonas Andersson, Malmö (SE)

(73) Assignee: NUANCE COMMUNICATIONS INC., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/300,157

(22) Filed: Jun. 9, 2014

(65) Prior Publication Data

US 2014/0285460 A1 Sep. 25, 2014

Related U.S. Application Data

(63) Continuation of application No. 13/651,177, filed on Oct. 12, 2012, which is a continuation of application No. 12/779,853, filed on May 13, 2010, now Pat. No. 8,310,461.

(51) Int. Cl.
*G06F 3/041* (2006.01)
*G06K 9/00* (2006.01)
(Continued)

(52) U.S. Cl.
CPC .......... *G06K 9/00402* (2013.01); *G06F 3/0237* (2013.01); *G06F 3/0354* (2013.01); *G06F 3/04883* (2013.01)

(58) Field of Classification Search
CPC ............ G06F 3/03545; G06F 3/03547; G06F 3/0487; G06F 3/0488; G06F 3/04883; G06F 3/04886; G06F 3/0233; G06F 3/0237; G06F 3/00416; G06F 17/276; G06F 3/00; G06F 3/01; G06F 3/03; G06F 3/033; G06F 3/0354; G06F 3/041; G06F 3/0412; G06F 3/0414; G06F 3/0416; G06F 3/042; G06F 3/0421; G06F 3/0423; G06F 3/0425; G06F 3/0426; G06F 3/0428; G06F 3/043; G06F 3/0433; G06K 9/00422; G06K 9/00429; G06K 9/00436; G06K 9/222; G06K 2209/01
USPC ......... 345/156–179; 178/18.01–18.09, 18.11, 178/19.01–19.07
See application file for complete search history.

(56) References Cited

U.S. PATENT DOCUMENTS 6,711,290 B2 3/2004 Sparr et al.
7,013,046 B2 3/2006 Kawamura et al.
(Continued)

FOREIGN PATENT DOCUMENTS

CN 1290371 4/2001
CN 1351310 5/2002
(Continued)

OTHER PUBLICATIONS
Cheriet, , "Word and String Recognition", Jan. 2007; XP002897085; ISBN: 978-0-471-41570-1, pp. 204-264.
(Continued)

*Primary Examiner* — Stephen Sherman
(74) *Attorney, Agent, or Firm* — Michael A. Glenn; Perkins Coie LLP

(57) ABSTRACT

A handwriting recognition apparatus facilitates user entry of strokes one on top of another. The apparatus, which includes a processor and a display integrated with a touch sensitive screen, receives a series of strokes via the screen. Each stroke is defined by contact, trace, and lift occurrences. Each stroke appears on the display until occurrence of a prescribed event, and then disappears. The apparatus accumulates strokes into a buffer and interprets all accumulated strokes collectively against a character database and optionally a linguistic database, to identify multiple candidate strings that could be represented by the accumulated strokes. The apparatus displays candidate strings for user selection after all strokes have faded, or after receiving a user submitted delimiter, or after a given delay has elapsed following user entry of the latest stroke. Alternatively, candidate strings are displayed after each stroke without waiting for timeout or explicit delimiter.

24 Claims, 11 Drawing Sheets

(51) Int. Cl.
*G06F 3/023* (2006.01)
*G06F 3/0488* (2013.01)
*G06F 3/0354* (2013.01)

(56) References Cited

U.S. PATENT DOCUMENTS

| | | |
|---|---|---|
| 7,313,277 B2 | 12/2007 | Morwing et al. |
| 7,502,017 B1 | 3/2009 | Ratzlaff et al. |
| 2004/0012558 A1 | 1/2004 | Kisuki et al. |
| 2006/0239560 A1 | 10/2006 | Sternby |
| 2009/0160785 A1 | 6/2009 | Xun |
| 2009/0161958 A1 | 6/2009 | Markiewicz |
| 2009/0226091 A1 | 9/2009 | Goldsmith et al. |
| 2009/0256808 A1 | 10/2009 | Kun |

FOREIGN PATENT DOCUMENTS

| | | |
|---|---|---|
| CN | 1469229 | 1/2004 |
| WO | WO-0013131 | 3/2000 |
| WO | WO-2007100289 | 9/2007 |
| WO | WO-2008005304 | 1/2008 |

OTHER PUBLICATIONS

Honso, , "Handwiritng Recognition for Android", www/youtube.com/watch?v=bCXsfVOUezA, retrieved from internet May 14, 2013; XP054975145.

Nuance Press Release, , "Nuance Unveils T9 for Pen-Based and Touch Screen Devices", Feb. 15, 2010; retrieved online on Apr. 8, 2010 from website: http://www.nuance.com/new/pressreleases/1020/20100216_t9Write.asp; 2pgs.

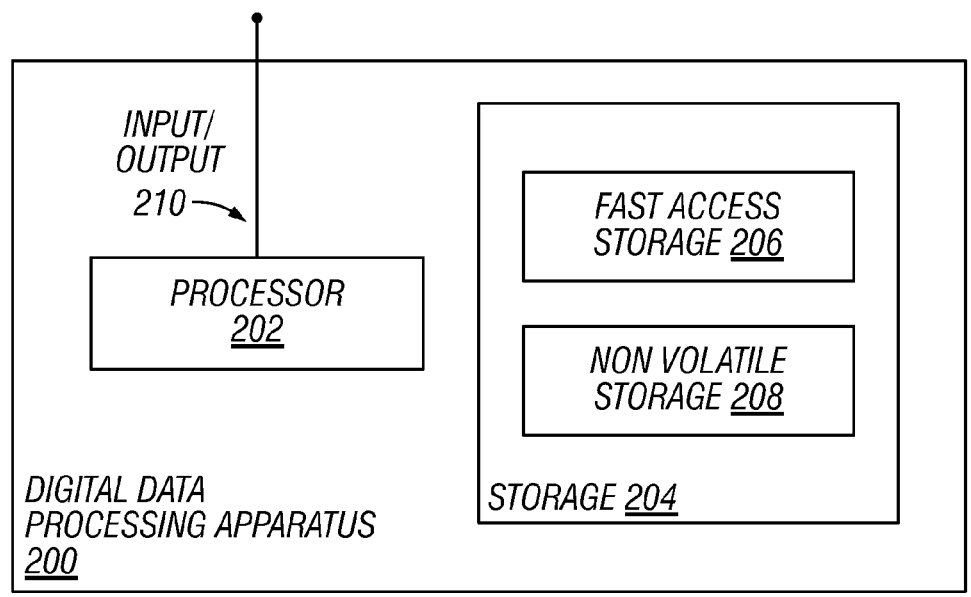
FIG. 2
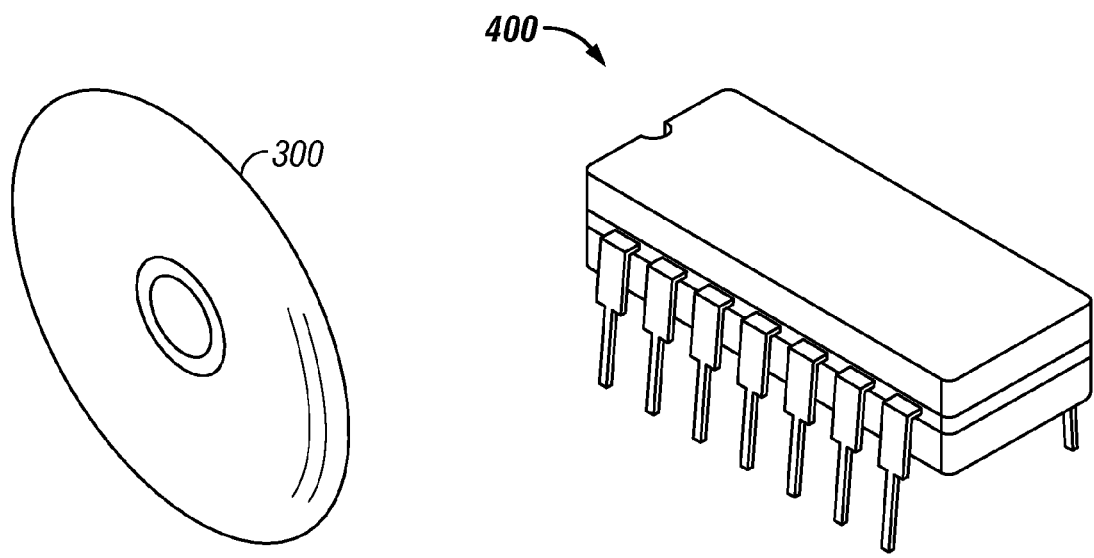
FIG. 3  FIG. 4

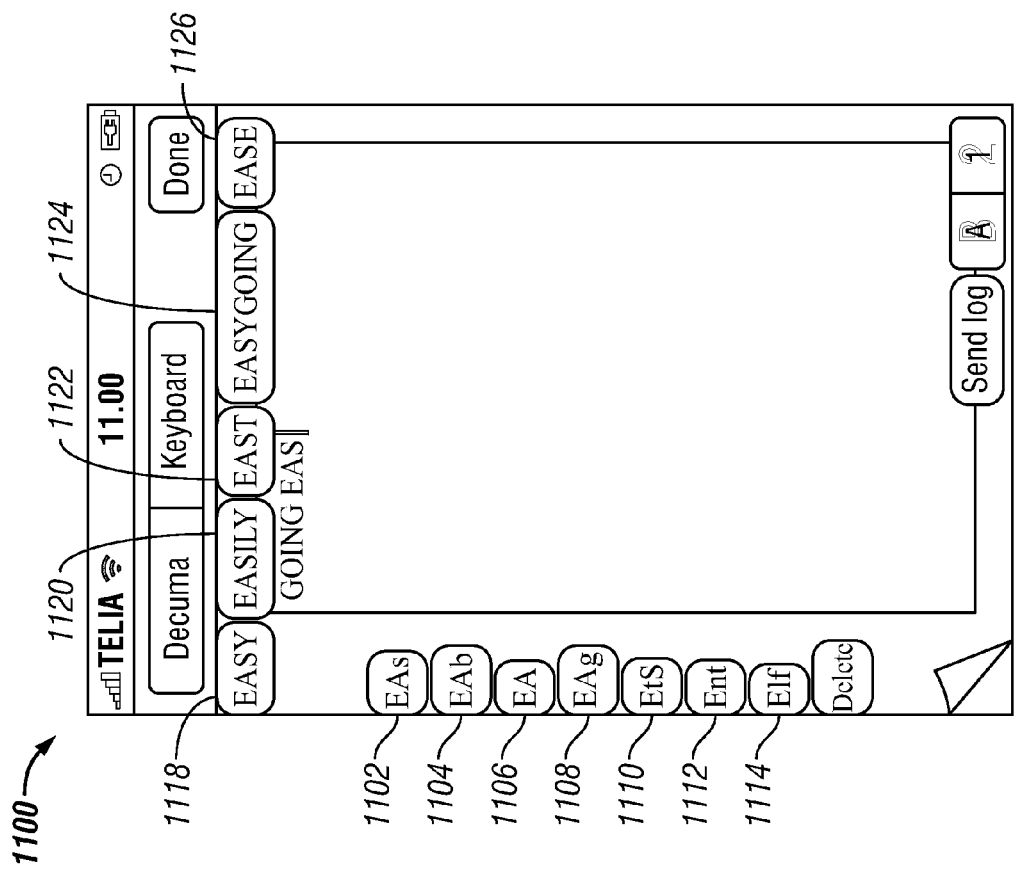
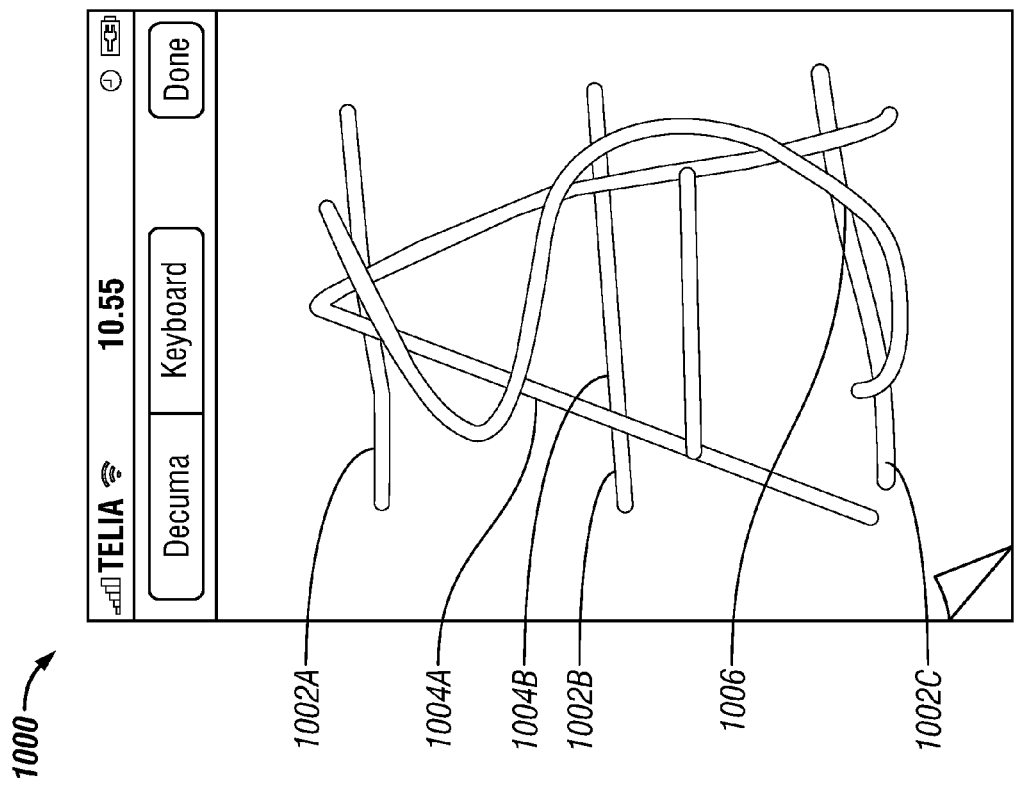
FIG. 11
FIG. 10

1500

|   | 1 | 2 | 3 | 4 | 5 |
|---|---|---|---|---|---|
| 1 | '1' 171<br>'I' 171<br>'"' 249<br>'\' 294 | '-' 207<br>'\' 547<br>'m' 824<br>'m' 835 | '1' 171<br>'I' 171<br>'"' 251<br>',' 326 | 'o' 257<br>'O' 273<br>'D' 406<br>'u' 457<br>... | 'w' 246<br>'W' 309<br>'N' 505<br>'W' 686<br>... |
| 2 |   | 't' 272<br>'F' 442<br>'f' 451<br>'Z' 512<br>... | 't' 370<br>'Y' 402<br>'y' 477 | 'N' 419<br>'k' 664<br>'F' 679<br>'t' 713<br>... | 'w' 699<br>'W' 712<br>'k' 758<br>'u' 751<br>... |
| 3 |   |   | 'H' 173<br>'N' 483 | '%' 512<br>'®' 770<br>'N' 791<br>'k' 835 | 'H' 729<br>'k' 752 |
| 4 |   |   |   | 'E' 1061 | 'E' 1177 |
| 5 |   |   |   |   |   |

*FIG. 15*

|   1   |   2   |   3   |   4   |   5   |
|-------|-------|-------|-------|-------|
| "I" 171 106 | "t" 544 344 | "H" 519 328 | "Ho" 843 540 | "How" 1138 737 |
| "l" 171 107 | "T" 884 559 | "t'" 1011 639 | "HO" 854 567 | "HOW" 1214 815 |
| "`" 249 249 | "P" 902 570 | "It" 1071 678 | "Hu" 1052 673 | "HON" 1424 990 |
| "/" 294 294 | "Z" 1024 559 | "Fl" 1098 721 | "HU" 1043 692 | "Hou" 1586 1028 |
|  | "z" 1096 719 | "fl" 1096 727 | "Hr" 1349 937 | "HOU" 1659 1114 |
|  | "Im" 1275 806 | "Fl" 1098 729 | "flo" 1422 944 | "HUN" 1618 1125 |
|  |  | "t'" 1167 738 | "Flo" 1424 945 | "flow" 1717 1207 |
|  |  | "tl" 741 741 | "tho" 1499 960 | "Flow" 1719 1208 |
|  |  | "tl" 742 742 | "HD" 979 979 | "HOw" 1220 1220 |
|  |  | "It" 1071 744 | "Hb" 1028 1028 | "Hon" 1798 1222 |
|  |  | "th" 1182 747 | "H." 1617 1035 | "Hov" 1685 1250 |
|  |  | "t\" 929 762 | "Ht" 1354 1036 | "HoW" 1314 1314 |
|  |  |  | "tlo" 1067 1067 | "Hoa" 1889 1328 |
|  |  |  | "tlo" 1068 1068 | "HOV" 1757 1331 |
|  |  |  | "tlO" 1075 1075 | "HDw" 1340 1340 |
|  |  |  | "tlO" 1076 1076 | "HDW" 1344 1344 |
|  |  |  | "thu" 1715 1098 | "Huw" 1352 1352 |
|  |  |  | "HG" 1106 1106 | "Ho" 2093 1357 |
|  |  |  | "HV" 1117 1117 | "tlow" 1362 1362 |
|  |  |  | "FlD" 1560 1121 | "tlow" 1362 1362 |
|  |  |  | "FlV" 1696 1126 | "Hun" 2012 1367 |
|  |  |  | "flu" 1630 1133 | "Hbw" 1383 1383 |
|  |  |  | "H'" 1769 1133 | "HUw" 1401 1401 |

*FIG. 16*

METHOD AND APPARATUS FOR ON-TOP WRITING

CROSS REFERENCE TO RELATED APPLICATIONS

This application is a continuation of U.S. patent application Ser. No. 13/651,177, filed Oct. 12, 2012, which is a continuation of U.S. patent application Ser. No. 12/779,853, filed May 13, 2010, now U.S. Pat. No. 8,310,461, issued on Nov. 13, 2012, the entirety of each which is incorporated herein by this reference thereto.

BACKGROUND OF THE INVENTION

1. Field of the Invention

The invention relates to computer user interfaces. More particularly, the invention concerns a portable computing device that receives user input including a sequence of handwritten strokes entered on top of each other.

2. Description of the Related Art

Handheld digital devices are becoming increasingly widespread. Some digital devices are dedicated to simpler tasks, as in the case of a television remote control. Other devices offer general purpose computing platforms, as in the case of personal data assistants (PDAs). Other devices offer a combination of these, as in the case of many mobile phones, which place and receive calls, but also perform address management, web surfing, text messaging, and other computing functions.

Although some handheld, general purpose computers offer a full keyboard, many others do not. Some handheld computers offer handwriting recognition, which helps avoid some of the problems of not having a full keyboard. However, the display of a portable computing device is reduced in size, compared to a normal computer display. And, since handwriting entry occurs on the display, then the handwriting entry area is effectively reduced with respect to a full sized computer. Being constrained with a reduced handwriting entry area presents various challenges in designing user interfaces that are still simple, intuitive, fast, and powerful.

SUMMARY OF THE INVENTION

A handwriting recognition apparatus facilitates user entry of strokes one on top of another. The apparatus, which includes a processor and a display integrated with a touch sensitive screen, receives a series of strokes via the screen. Each stroke is defined by contact, trace, and lift occurrences. Each stroke appears on the display until occurrence of a prescribed event, and then disappears. The apparatus accumulates strokes into a buffer and interprets all accumulated strokes collectively against a character database and optionally a linguistic database, to identify multiple candidate strings that could be represented by the accumulated strokes. The apparatus displays candidate strings for user selection after all strokes have faded, or after receiving a user submitted delimiter, or after a given delay has elapsed following user entry of the latest stroke. Alternatively, candidate strings are displayed after each stroke without waiting for timeout or explicit delimiter.

BRIEF DESCRIPTION OF THE DRAWINGS

FIG. 2 is a block diagram of a digital data processing machine.

FIG. 3 shows an exemplary storage medium.

FIG. 4 is a perspective view of exemplary logic circuitry.

FIGS. 6-12 show some screenshots depicting an exemplary operating sequence.

FIG. 15 shows an example of a segmentation graph.

FIG. 16 shows an example of a recognition graph

DETAILED DESCRIPTION

The nature, objectives, and advantages of the invention will become more apparent to those skilled in the art after considering the following detailed description in connection with the accompanying drawings.

Hardware Components and Interconnections

Overall Structure

Figure 1:
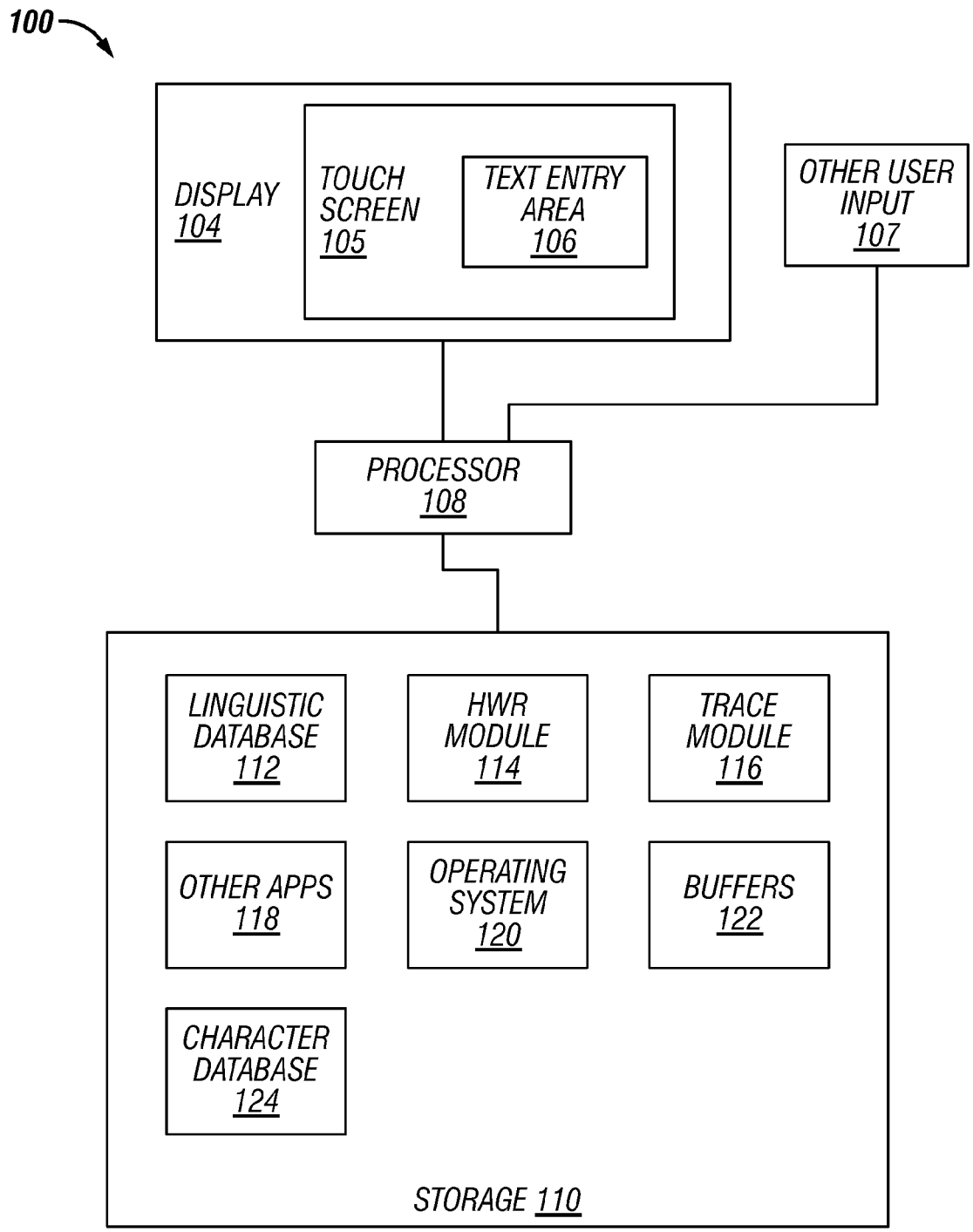
FIG. 1 is a block diagram of the components and interconnections of a portable text entry device.

FIG. 1 shows a portable electronic device 100. Broadly, this is an electronic device such as a telephone, PDA, pager, radio, camera, global positioning system (GPS) unit, address book, or a different device or combination of such devices. In addition to other functions, then, the device includes a facility for a user to enter text. As with other devices of this size, it can be a challenge to provide a convenient and comfortable means for users to enter text data. This device 100 enables the user to enter text by handwriting with a finger or stylus, and furthermore, where the user can enter letters on top of each other in a technique referred to as "on-top writing." With on-top writing, the user can hand write letters as large as the screen permits, and moreover, the user can write naturally with all the commonly known variants of character shapes, consisting of one or several strokes per character without being constrained by any prescribed letter patterns or "graffiti." To implement on-top writing in a workable manner, the device 100 includes a number of unique features. One such feature is a technique in which the device 100 displays and then fades presentation of each stroke entered by the user, and after a given time, stops displaying the stroke entirely. This and various other features of the device 100 are discussed in greater detail below.

The device 100 includes a display 104 for displaying images, text, and video, and the like. As an example, the display 104 may use LCD, plasma, CRT, or any other technology appropriate for the purposes of this disclosure. Some or all of the display 104 is co-located with a touch screen 105. The touch screen 105, as an example, may employ a technology such as capacitive, resistive, infrared, etc. A text entry area 106 lies within some or all of the touch screen 105 area. The text entry area 106 may or may not be bounded by a permanent or video-generated border to make the area 106 more distinct.

In addition to the touch screen 105, the device 104 may have other user input 107 such as a full or reduced keyboard, telephone keypad, microphone, camera, or virtually any other apparatus to receive input from a human user.

The device 100 is managed by a processor 108. This may be implemented by one or more hardware devices, software devices, a portion of one or more hardware or software devices, or a combination of the foregoing. FIGS. 2-4, discussed in detail below, illustrate the makeup of data processing components of the device 100.

Digital data storage 110 may be implemented by one or multiple devices, but these are shown as a single unit 110 for ease of explanation. Each such storage facility may be implemented by volatile or nonvolatile circuit memory, magnetic disk storage, optical storage, or virtually any other machine readable storage means appropriate for the purposes of this disclosure.

The linguistic database 112 contains a machine-readable listing of various text entries, which are used to help resolve the user's handwriting inputs as explained in greater detail below. In one embodiment, these entries comprise words formed by an alphabet. In other embodiments, the linguistic database 112 may comprise a dictionary of text strings, character trigram frequency table, dictionary plus word bigram table, bigram dictionary, or other construct appropriate to the purposes of this disclosure. Another example is a 3-D table where each axis represents various possible characters, and a given value (such as "1") indicates a valid trigram and another given value (such as "0") represents a trigram that is not valid. The database 112 may be fixed or subject to change by downloading updates, addition of user entries, or other sources of new or changed information. One example of a dictionary is a list of Unicode strings with different frequency classes, stored in a suitably compact format. For ease of description, the examples given herein below refer to a dictionary of words.

The handwriting (HWR) module 114 comprises programming to apply certain handwriting recognition techniques to user input. In one example, the module 114 is implemented with a segmentation system similar to the teachings of US Patent Application 2006/0239560 entitled "Recognition Graph" in the name of Jakob Sternby and a character recognizer according to the teachings of U.S. Pat. No. 6,711,290 entitled "CHARACTER RECOGNITION" patented on Mar. 23, 2004 in the names of Gunnar Sparr and Rikard Berthilsson. The entirety of the foregoing documents are incorporated herein by reference.

In the illustrated example, the HWR module 114 comprises stored programming instructions, which are executable by the processor 108. In other examples, the module 114 may comprise discrete circuitry, logic circuitry, application specific integrated circuitry, or another mechanism that does not require execution by the processor 108.

The trace module 116 comprises programming to present, fade, and discontinue presentation of user's handwriting inputs according to certain methodology described below. As with the module 114, the module 116 may be implemented by stored programming instructions (as illustrated), discrete circuitry, logic circuitry, application specific integrated circuitry, or another mechanism.

The other application programs 118 comprise programs related to handwriting recognition as described herein, or totally different functions, or both. The applications 118 include programs provided with the device 100 upon manufacture, and may further include programs downloaded into the device 100 after manufacture. Some examples include a text editor, telephone dialer, contacts directory, instant messaging facility, email program, word processing program, web browser, camera, etc.

The operating system 120 controls the execution of programs such as the modules 114, 116, 118, manages resources of the device 100 and performs any other functions appropriate for an operating system. The operating system 118 may be a proprietary operating system or a commercially available operating system, such as PALM®, WINDOWS®, IPHONE OS®, and such.

The buffers 122 comprise various storage buffers for temporarily storing data such as accumulated user input, text being presented on the display 104, output from the various modules and applications 114, 116, 118, or any other data suitable for buffering. Instead of being implemented in the storage 110, the buffers 122 may be implemented as various registers or other constructs integrated into the processor 108.

The character database 124 comprises a machine-readable listing of various predefined characters, which are used to help identify characters from the user's stroke inputs. In one embodiment, these entries comprise letters of an alphabet. In any case, the database 124 contains a mapping of each listed character and the constituent strokes that product that character. In one example, the character database may be referred to as a shape database. In order to accommodate a more natural writing style, the database 124 may include the following feature. For some or all of the characters, the database 124 may prescribe multiple alternative stroke combinations that are capable of forming that same character. The database may be fixed or subject to change by downloading updates, addition of user entries, or other sources of new or changed information.

Exemplary Digital Data Processing Apparatus

As mentioned above, data processing entities, such as the processor 108, modules 114 and 116, and application programs 118 may be implemented in various forms of hardware.

Some examples include a general purpose processor, digital signal processor (DSP), application specific integrated circuit (ASIC), field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

As a more specific example, FIG. 2 shows a digital data processing apparatus 200. The apparatus 200 includes a processor 202, such as a microprocessor, personal computer, workstation, controller, microcontroller, state machine, or other processing machine, coupled to a digital data storage 204. In the present example, the storage 204 includes a fast-access storage 206, as well as nonvolatile storage 208. The fast-access storage 206 may be used, for example, to store the programming instructions executed by the processor 202. The storage 206 and 208 may be implemented by various devices, such as those discussed in greater detail in conjunction with FIGS. 3 and 4. Many alternatives are possible. For instance, one of the components 206, 208 may be eliminated; furthermore, the storage 204, 206, and/or 208 may be provided on-board the processor 202, or even provided externally to the apparatus 200.

The apparatus 200 also includes an input/output 210, such as a connector, line, bus, cable, buffer, electromagnetic link, network, modem, transducer, IR port, antenna, or other means for the processor 202 to exchange data with other hardware external to the apparatus 200.

Storage Media

As mentioned above, various instances of digital data storage may be used, for example, to provide storage 110 used by the device 100 (FIG. 1), to embody the storage 204 and 208 (FIG. 2), and for other purposes. Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the storage media may be implemented by nearly any mechanism to digitally store machine-readable signals. One example is optical storage such as CD-ROM, WORM, DVD, digital optical tape, disk storage 300 (FIG. 3), or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Logic Circuitry

In contrast to storage media that contain machine-executable instructions, as described above, a different embodiment uses logic circuitry to implement data processing features of the device 100.

Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

FIG. 4 shows an example of logic circuitry in the form of an integrated circuit 400.

OPERATION

Having described the structural features of the present disclosure, the operational aspect of the disclosure will now be described. The steps of any method, process, or algorithm described in connection with the embodiments disclosed herein may be embodied directly in hardware, in a software module executed by hardware, or in a combination of the two.

Overall Sequence of Operation

Figure 5:
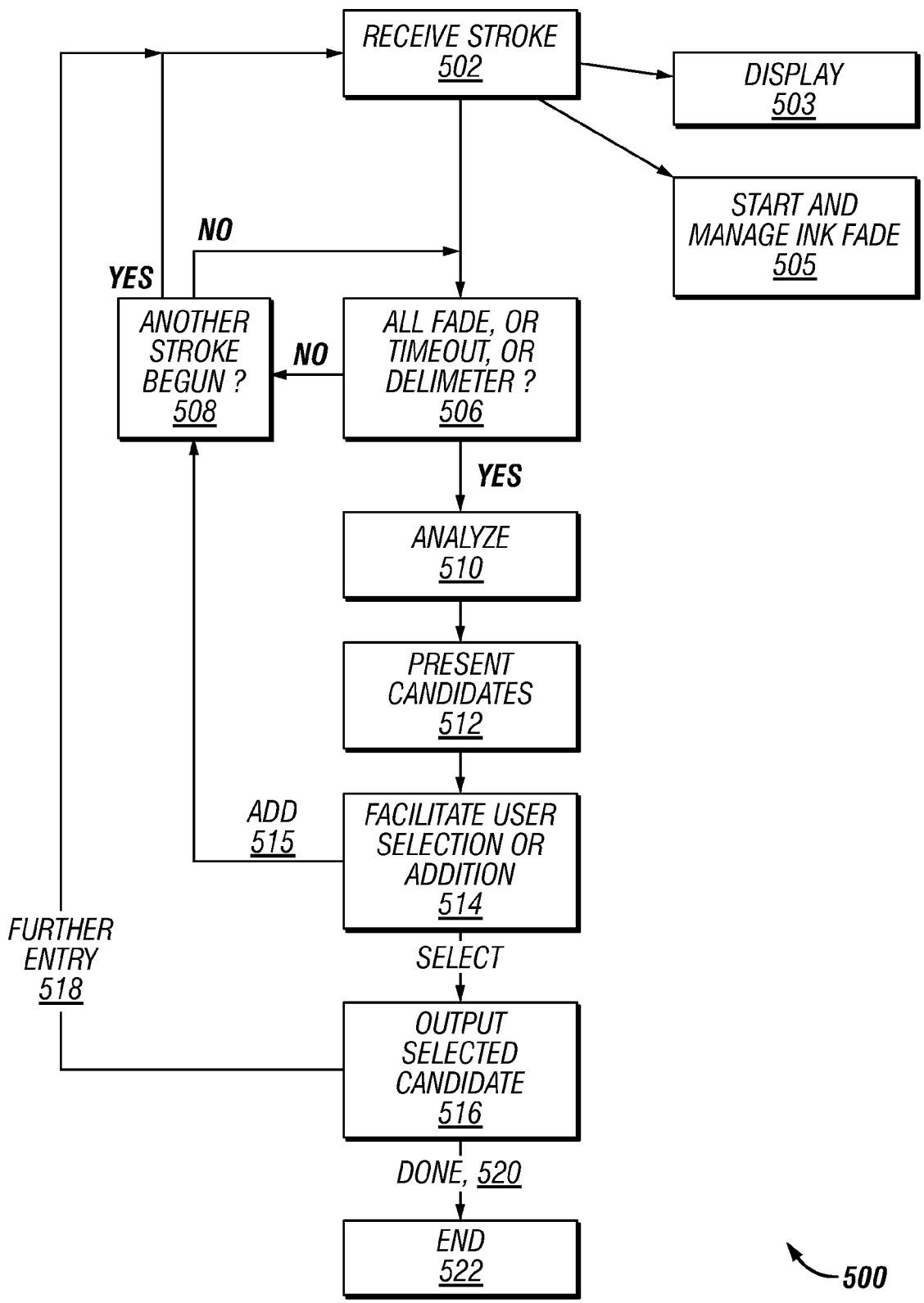
FIG. 5 is a flowchart depicting an exemplary operating sequence.

FIG. 5 shows an exemplary operating sequence 500 of the device 100. In step 502, the processor 108 detects receipt of a user-entered stroke via the touch screen 105. This stroke being processed is referred to as the "current" stroke.

Generally, a stroke refers to an instance of user-entered contact with the touch screen 105 having various parameters including a first coordinate on the touch screen where initial contact occurs ("contact point"), a second coordinate on the touch screen where the pen or stylus is lifted ("release point"), and a path upon which the user transitions along the touch screen between the contact point and release points. In many instances, a capital "I" includes one stroke, whereas a capital "H" includes three strokes. The device 100 does not require the user to observe any particular pattern for entering letters, however, and therefore accommodates a variety of different ways in which letters may be entered. The user may contact the touch screen 105 with a finger, stylus, pen, or other appropriate object. For ease of description, the contacting object may be referred to as a "stylus" regardless of the actual object being used. In one example, the processor 108 stores the current stroke in one of the buffers 122.

Also as part of step 502, the processor 108 sets a stroke timer. This timer is reset each time the device 100 receives completion of a new stroke. For each stroke, the stroke timer counts time starting from user completion of the stroke. This helps to keep track of a "stroke timeout," discussed below. There is also a "word timeout," and when there are no new strokes in a given word timeout period, the device 100 takes certain actions, as discussed in greater detail below.

As part of step 502, the trace module 116 determines the current stroke's parameters as mentioned above. Based on this, the trace module 116 in step 503 causes the display 104 to show the current stroke. The module 116, in one example, is programmed to depict all strokes in one color. Alternatively, step 503 may employ a variety of colors, textures, etc. Stroke depictions are referred to as "ink traces." With an electronic display, of course there is no ink, but the term is appropriate since the strokes are depicted like ink from a pen.

Step 502 additionally stores the received stroke in one of the buffers 122. The stored stroke is therefore accumulated for consideration, along with other accumulated strokes, as to the possible formation of a word.

Concurrently with step 503, the trace module 116 causes (505) the depiction of the current stroke to begin fading at a rate where the depiction will disappear completely in a prescribed time, such as one second from initiation of the stroke time. In other words, when a certain period of time has elapsed after starting the stroke timer, the stroke's ink trace disappears completely. This time is referred to as a "stroke timeout." In one example, the stroke timer begins when the user ends the current stroke by lifting the finger or stylus. In order to track the various strokes times of entry, fading, and disappearance, the trace module 116 may employ the buffers 122. Thus, in one embodiment, step 505 starts a stroke timer.

As an alternative to fading strokes according to time, step 505 may fade strokes according to a prescribed event. One example is the commencement or completion of entry of a given subsequent stroke. For instance, step 505 may partially fade all displayed strokes when the next stroke is entered. The increment of fading may be chosen, for example, so that each stroke fades completely after three subsequent strokes are entered. In this way, step 505 manages serial disappearance of entered strokes, always maintaining a certain number of most recently entered strokes.

Step 506 asks whether all ink traces have disappeared per step 505, or whether a prescribed "word timeout" has elapsed. The word timeout refers to a certain period of time on the stroke timer of the most recent stroke. For instance, ink fading for each stroke be set to occur one second after that stroke is completed (step 505), which is the predefined "stroke timeout" in this example. In contrast, the word timeout is different, and in one example this may be set to occur when there are two seconds on the stroke timer of the most recent stroke. According to one embodiment, step 506 may additionally ask whether the user has entered a prescribed delimiter such as a space, horizontal line, or other predetermined handwriting notation. Instead of these delimiters, or in addition, the prescribed delimiter may comprise user selection of a GUI feature such as a "done" button. If none of these from step 506 are true, then step 506 goes to step 508 to ask whether another stroke has begun. If so, step 508 returns to step 502. Otherwise, if the user has not started to enter another stroke, then step 506 repeats.

When step 506 is satisfied, such as when all ink traces have disappeared, or the word timeout has elapsed, or the user-entered delimiter has been received, then step 506 proceeds to step 510. In step 510, the processor 108 analyzes the current stroke along with any previously entered and accumulated strokes in order to allocate the strokes to letters, and the letters to candidate words. In one embodiment, the candidate words are taken exclusively from the character database 124. In another example, the candidate words include a combination of entries from the character database 124 and the linguistic database 112. In another embodiment, step 510 uses words from one or both databases along with some literal interpretations of the entered strokes regardless of whether they appear in the databases. In one example, step 510 is conducted by the process 1300 depicted in FIG. 13 and further explained below.

The product of step 510 is a list of candidate strings. These are the strings most likely to represent the user's handwritten entries taking into account the matching of the shape of the strokes with the character database 124 and the word frequency according to the linguistic database 112.

In step 512, the processor 108 directs the display 104 to present the candidate words obtained in step 510. In step 514, the processor 108 facilitates user selection of one of the candidate words, and then presents the selected candidate in step 516 on the display 104 For instance, the selected word may be output in a designated area of the display 104.

In contrast to the foregoing sequence, step 506 may be omitted, in which case the apparatus displays candidate words (step 512) after each stroke, rather than waiting for a timeout or explicit delimiter. In this case, step 508 is performed between steps 512 and 514.

Returning to the sequence 500 as illustrated, responsive to the user opting to add further strokes, step 514 returns to step 508 via 515 where the user can add-on to the current stroke sequence.

The user may indicate completion of the current phrase or sentence by activating an appropriate GUI feature, such as a "done" button. This occurs in step 520. When the user finishes 520 entering words in the current phrase or sentence, then step 516 advances to step 522. In step 522, the processor enters the selected candidate word in a standalone text entry application, or in another application 118 have a text entry aspect, such as a telephone dialer, contacts list, instant messaging facility, email program, word processing program, etc. In another embodiment the text is immediately entered into the stand-alone text application and the operating system 120 handles the communication means that allows the immediate editing of text in the stand-alone application.

After one of steps 522, 516, or 514, the processor 108 clears the buffer 122 of the accumulated strokes to prepare for receiving user entered strokes of a new word.

Various Features

In one embodiment, the user enters strokes by writing them one on top of the other. With on-top writing, the user can hand write letters as large as the screen 105 permits, and moreover, the user can write naturally without being constrained by any required letter patterns or "graffiti." On-top writing is possible because the device 100, as discussed above, displays and then fades presentation of each stroke entered by the user, and after the given stroke timeout, stops displaying the stroke entirely. This prevents the user from being confused by a bunch of overlapping and utterly unreadable letters. On the other hand, having the strokes visible for a while and not removing them from the screen immediately allows for the user to have a time window where old strokes are available as reference to where later strokes should be written for instance in a multi-stroke character like uppercase 'E'. Removing the visibility of the vertical stroke of the 'E' too soon would possibly make the user place the horizontal strokes out of position compared to his/her normal way of writing the character.

On-top writing, without being constrained by predetermined graffiti, is possible because of the manner in which the module 114 analyzes the strokes in steps 504 and 510. Namely, rather than interpreting solely per stroke or per character, the module 114 interprets all accumulated strokes collectively with the help of the predefined databases 112, 124 to identify multiple candidate strings that could potentially be represented by the accumulated strokes. This permits alternative analyses, whereby some strokes may be allocated to characters in one way to provide one potential outcome, and the strokes are allocated differently according to various other potential outcomes.

In one embodiment, the stroke timeout may be the same as the word timeout. In this embodiment, when the most recent stroke fades from view, then this triggers a "YES" answer to step 506. Accordingly, this triggers the analysis 510 whereupon the display presents 512 the candidate words. In a different embodiment, the stroke timeout may be different than the word timeout period. The stroke timeout and the word timeout periods may be fixed with the programming of the machine 100, or they may be user selectable.

As to the display of strokes in step 503, in one embodiment, the processor 108 may cause the display 104 to show the extent of the contact region exactly, such as an outline or solid depiction. In a different example, step 503 may show the contact region plus a given number or percentage of pixels in order to expand and embolden the contact region, or even do the opposite to make the depicted stroke thinner. These configurations may be fixed with the programming of the machine 100, or they may be user selectable.

Also as to the display of strokes in step 503, if the user enters multiple strokes before the word timeout period expires, or before all strokes fade, it is possible that the display 104 will show all strokes at the same time. Each stroke, of course, will appear in a different stage of fading.

Exemplary Operating Sequence

FIGS. 6-12 depict some screenshots to illustrate various operational scenarios. These are not intended to be limiting, but rather, to illustrate some exemplary user interactions.

Figure 7:
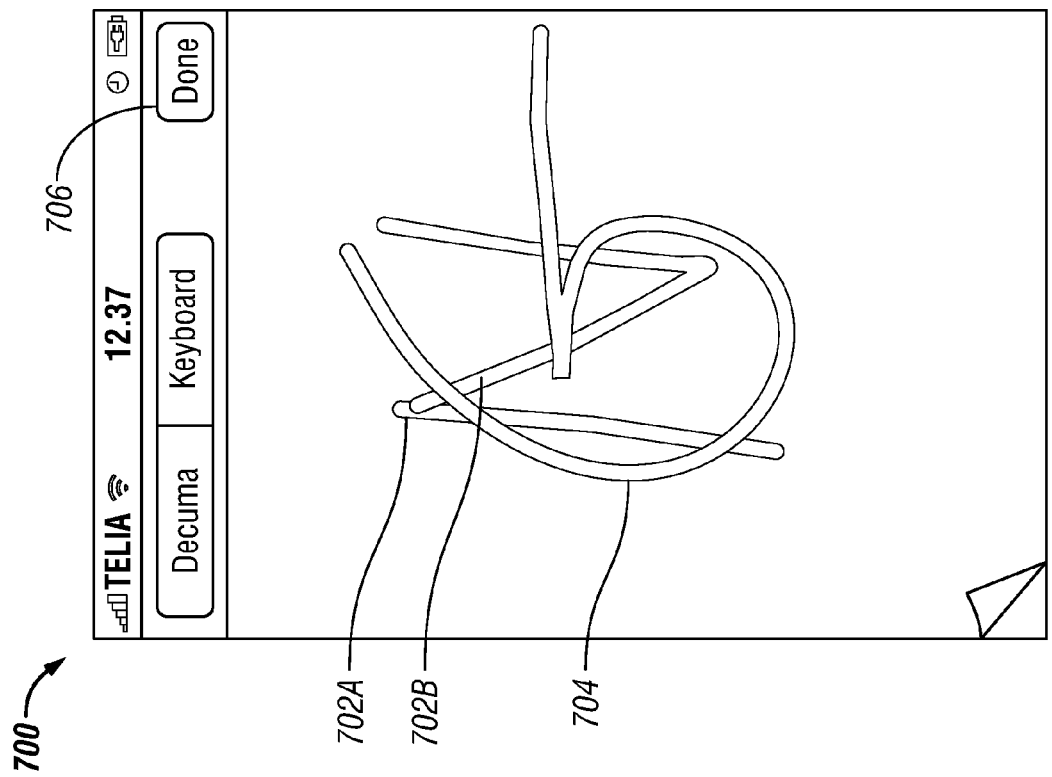
Figure 6:
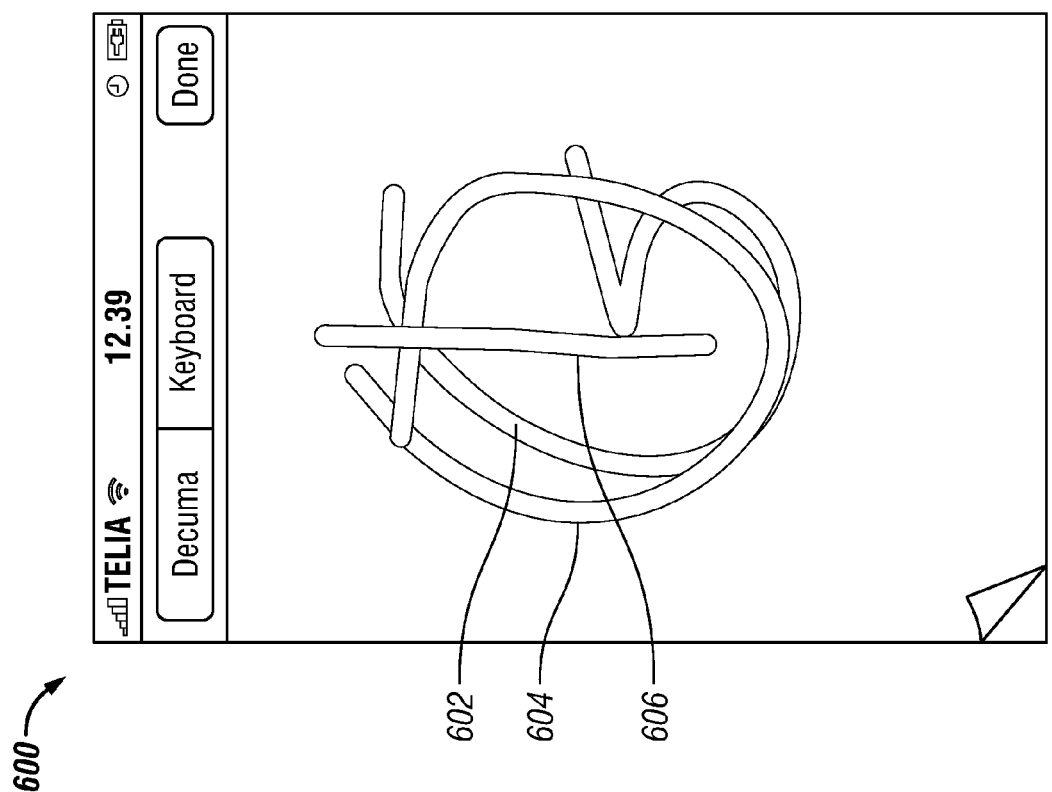

FIGS. 6-7 shows two screenshots 600 and 700 of the display at two different times during the process of on-top writing where a user is entering the sequence of letters "G-O-I-N-G." In FIG. 6, the user has entered "G-O-I" so far. The user has entered each of these letters with a single stroke, which the device 100 processed and displayed during successive performances of steps 502 and 503. The strokes are entered on top of each other, and indeed, the strokes substantially overlap. Since the "G" was received first, the fading 505 for this stroke started first, and the ink trace 602 for "G" has faded most. Since the "O" was received next, the ink trace 604 for "O" is less faded. Since the "I" was received most recently, the ink trace 606 for "I" is the least faded. It is not necessary that the user enter strokes on-top of each other, since the sequence 500 still functions perfectly. However, the sequence 500 provides a useful benefit in that it accommodates on-top writing.

FIG. 7 shows a screenshot 700 of the display at a different time during the same process of entering "G-O-I-N-G." This snapshot is taken after the entire word has been entered. Here, the first letters "G-O-I" have faded completely because their respective stroke timeouts have all occurred, relative to the initial entry of those strokes in respective performances of 502. However, the ink traces 702a-702b for the "N" stroke are still visible, and to a greater extent, the ink trace 704 for the final "G" stroke is even more visible. The "N" and "G" strokes were entered on-top of each other.

The screenshot 700 shows the done button 706 as one exemplary form of delimiter. Thus, step 506 would be triggered when the user depresses the done button 706. The device 100 may be additionally programmed to execute step 506 when all strokes fade completely, when the word timeout occurs, or the user enters a stroke notation delimiter. Alternatively, the done button 706 may function to remove the whole input layer and allows the user to scroll the text field and conduct other actions that are then not interpreted as ink creation.

Figure 8:
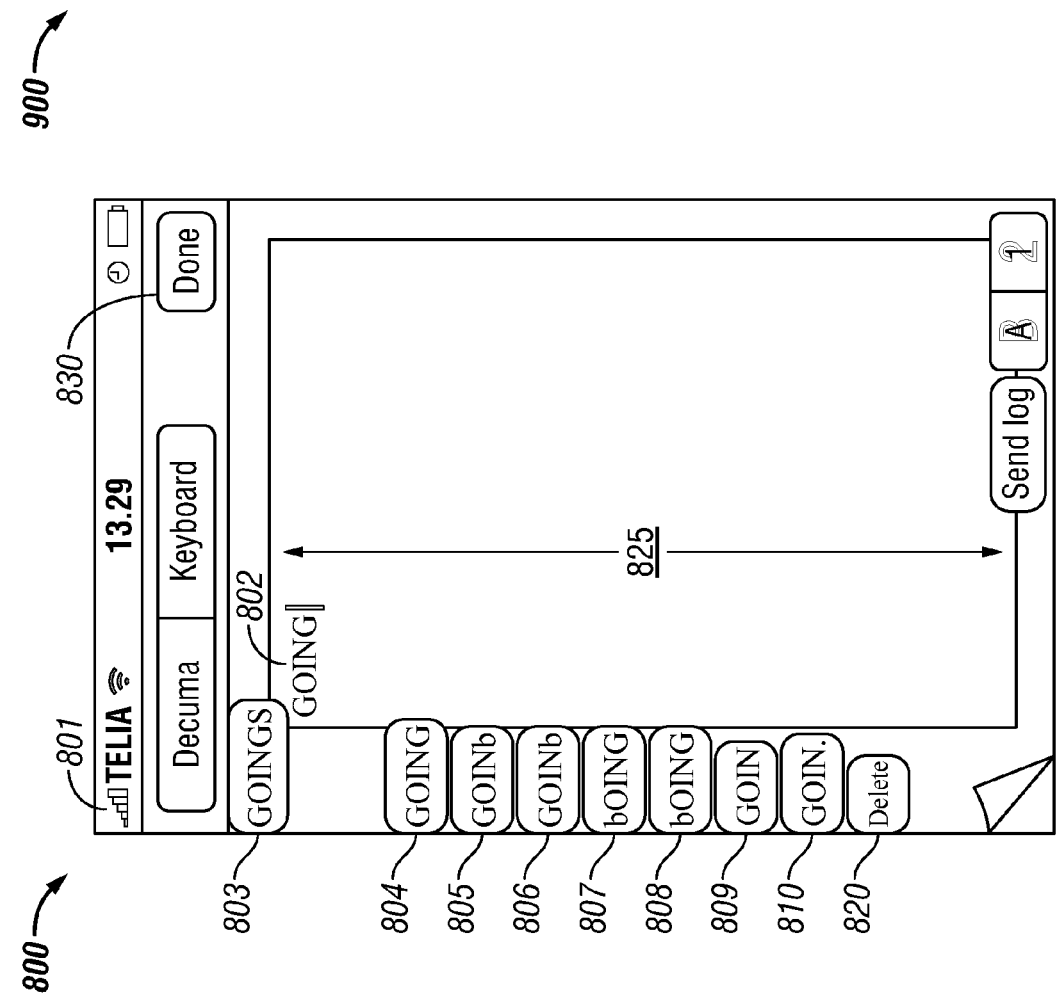
Figure 12:
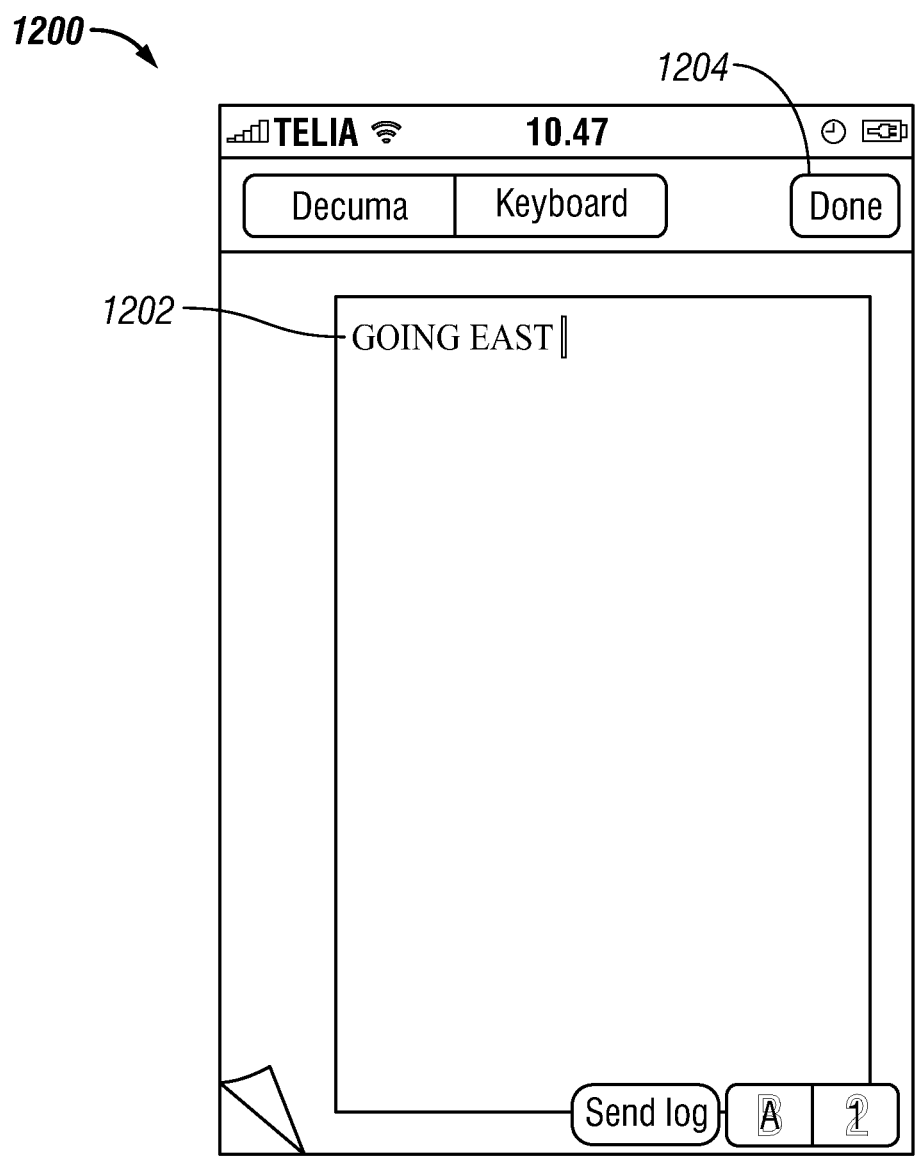

FIG. 8 shows a screenshot 800 of the display exemplifying the presentation of candidates from step 512 and user selection or addition from step 514. In this example, a region 825 of the display 801 is designated for user output, until the user finalizes the current phrase or sentence being entered. In this example, the current phrase or sentence is finalized when the user presses a "done" button 830. This corresponds to action 520 from FIG. 5. In FIG. 8, the display 801 is shown with the candidates 803-810 at left. The device 100 automatically entered the best candidate in the region 825, corresponding to the entry of "G-O-I-N-G" as discussed previously. If the user disagrees with the default candidate, the user can select any one of the other presented candidates 803-810 by pressing that candidate.

The candidates 803-810 in this example represent some words from the linguistic databases 112, such as GOIN, but also some other non-database words such as GOINb. In one example, the device 100 distinguishes between database and non-database words, for example by using different colors. In response to user selection of a delete button 820, the device 100 would clear the contents of the region 825. The word GOINGS 803 is a word completion candidate based on the candidate GOING 804 as a base.

As mentioned above, the done button 830 is programmed to trigger action 520, which would end text entry and accept the current contents of the region 825 for use in a standalone text entry application, telephone dialer, contacts list, instant messaging facility, email program, word processing program, etc. In contrast to ending word entry, the user may decide to continue entering words.

Figure 9:
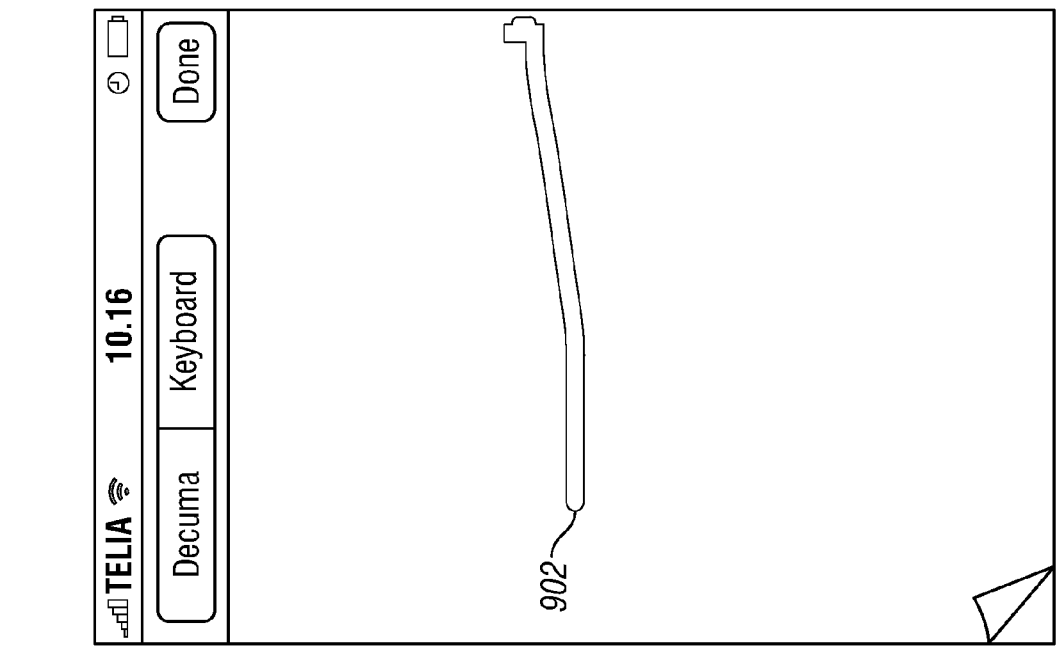

This corresponds to action 518 from FIG. 5. This is affected by the user entering further text. This impliedly accepts the proposed word 802, triggers removal of the candidates 803-810, and commences the stroke entry mode with its fading ink traces and other features discussed previously. In the illustrated example, the user commenced 518 by entering a space, and namely by entering a single horizontal stroke 902 entered from left to right as shown in FIG. 9. This accepts (not shown) the proposed word "GOING" from 802 and returns to the stroke entry mode.

Continuing with this example, the user subsequently enters "E-A-S" as shown by the screenshot 1000 of FIG. 10. The user entered the strokes of "E-A-S" on top of each other. As depicted in FIG. 10, presentation of the three constituent strokes 1002a-1002c of the "E" are most faded. Presentations of the two strokes 1004a-1004b of the "A" are less faded. Presentation of the single stroke "S" 1006 is least faded, since it was entered most recently. Furthermore, as between the strokes 1002a-1002c of the "E," the stroke 1002a is most faded having been entered first, the stroke 1002b less faded, and the stroke 1002c the least faded having been entered most recently.

FIG. 11 shows a screenshot 1100 resulting from step 512, when step 506 has answered "YES" after the user entered "E-A-S" as discussed above. The candidates 1102-1114 represent candidates from the linguistic database 112 and some candidates that the device 100 identified based upon the character database 124 because of their shape similarity to the user entered strokes. The candidates 1118-1126 are entries from the linguistic database 112 that represent proposed word completions of the accumulated stroke sequence.

In the illustrated example, the user selects the word completion candidate "EAST" by tapping on 1122, which corresponds to step 514. In response, the device 100 configures the display 104 to show "GOING EAST" as shown by 1202 in the screenshot 1200 of FIG. 12. This corresponds to step 516. At this point, the user may either continue entering text according to step 518, or press the done button 1204 to end the sequence 500 via 520 and 522.

Sequence of Operation of Stroke Analysis

Figure 13:
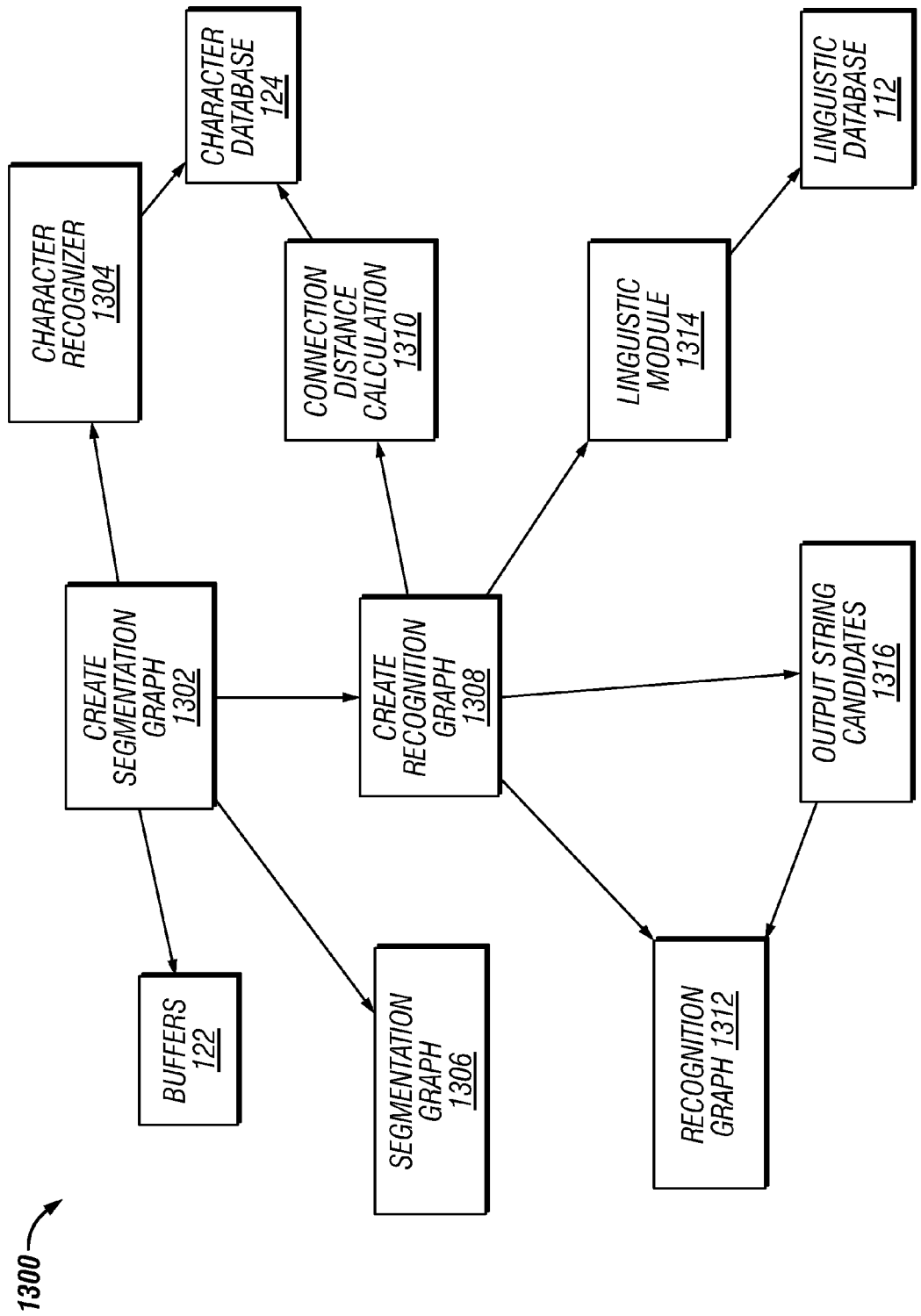
FIG. 13 shows a flowchart depicting analysis of stroke input.

FIG. 13 shows an exemplary operating sequence 1300 for the analysis of stroke input made in step 510. The first step 1302 is to create a segmentation graph 1306 based on the input strokes stored in the buffers 122. In one example, the segmentation graph 1306 is implemented in the form of a two-dimensional table.

The segmentation graph is created by combining each received stroke with preceding strokes so that position (X, N) in the two-dimensional table holds a list of character candidates for the combination of stroke X preceded by the N–1 preceding input strokes in the input order. As an example: Position (5, 1) will hold the candidates for the single fifth stroke. This can be a vertical stroke and the character candidates can then be 'I', 'l', '1' and more. If the sixth stroke in this example input is a horizontal stroke crossing the vertical fifth stroke, then on the position (6, 2) character candidates for the combination of the two will be stored and the graph can for example have 't', 'T', '+' at that position.

Each character candidate in the segmentation graph has a matching distance associated to it, which is a measurement of how well the character shape matches the character model in the character database 122. This matching distance, in one example, is produced by a character recognizer 1304, which takes the strokes of a potential character and matches these with the data in the character database 122, according to a predefined function. This may include an arrangement, for example, where a lower distance means a better match. In one embodiment the character recognizer 1304 is implemented according to the teachings of the teachings of U.S. Pat. No. 6,711,290, cited above.

In one list of character candidates, the same character might appear at several positions with different matching distances, since there can be many different models of the same character in the character database. The result of step 1302 is the segmentation graph 1306.

The next step 1308 uses the segmentation graph 1306 as input. In this step a second table is created, this time one-dimensional, where on position X, there is a list of string candidates made up from character candidates based on all the strokes starting from the very first stroke until stroke X. These character candidates are taken from the segmentation graph. The resulting table is called the recognition graph 1312.

The recognition graph 1312 is created so that at position X=1 in the recognition graph will only be string candidates from the character candidates at position (1, 1) of the segmentation graph.

At position X=2 of the recognition graph string candidates will be created by building on already created string candidates from X=1 and append character candidates from the segmentation graph (2, 1). The already created string candidates used from position X=1 are then denoted start strings in this context. At this position string candidates can also be created without using any start string, by only taking character candidates of the segmentation graph at position (2, 2).

At any position X=Y, Y>=2, the string candidates can be formed by taking start strings from position Y–N for N=1, 2, 3, . . . , Y–1 and appending character candidates from the segmentation graph at position (Y, N). But also from the candidates of the segmentation graph at position (Y, Y) without using any start string.

For each string candidate a score is calculated which in one embodiment is a function of the score of the start string used, the appended character candidate distance and the number of strokes of the character candidate. The string candidate in the last position of the recognition graph with the lowest or highest score, depending on the design of the function, will later be presented as the best string candidate. In the following discussion, it is assumed that previously mentioned function gives the best candidate the lowest score.

In one embodiment the function for creating the string candidate scores can be SS+C*NC, where SS is the start string distance, C is the character candidate distance and NC is the number of strokes of the appended character candidate.

The recognition graph can also make use of linguistic information such as a dictionary to promote the strings that are linguistically significant. In one embodiment, this promotion can be as strict as not creating any string candidates at all that are not (and cannot become) linguistically valid words. In another embodiment, linguistics can simply come in as an extra parameter to the function that calculates the string candidate score, for instance as a twenty percent reduction of the score if the string is such that it is a valid dictionary word, or can become a dictionary word when more characters are appended. In yet another embodiment, the linguistic data can have better resolution and the score reduction can depend of string frequency which is stored in the linguistic database. The reduction can also be further dependent of the length of the string. The tuning of the score reduction for linguistic significance is important to get a good balance between linguistic boosting and the possibility to write non-dictionary strings.

During step 1308, the creation of the recognition graph, a linguistic module is used 1314 which in turn uses the predefined linguistic database 112 to calculate the likeliness of different strings which is used as a parameter to the string candidate score calculation.

A further refinement of the string candidate score function can be the introduction of a connection distance. This measure looks at how the input strokes representing the appended character candidate are positioned relative to the input strokes of the start string and compares this to a stored model of how the character candidate and the characters in the start string should normally be positioned relative to each other. For instance if the start string has the characters 'ab' and the appended character candidate is 'c', then the strokes representing the 'c' are supposed to be of the approximately same height and vertical position as the 'a' and on the same vertical position as 'b' but with half the height. If this is not the case, the connection distance should be high and will negatively affect the string candidate score of the string 'abc'. The module responsible for calculating the connection distance is depicted as 1310 and it makes use of character positioning data stored in the character database 124. The result of step 1308 is the recognition graph 1312. The last step 1316 simply looks at the string candidates at the last position in the recognition graph and outputs the list of string candidates found at that position. The analysis 510 is then done and the list is used for the next step 512 of FIG. 5. In the present example, the output string candidates will not occur exclusively from the dictionary but will instead be a balanced mixed between dictionary words and non-dictionary strings.

For performance reasons, the full evaluation of all combinations of character candidates as described above may be abbreviated by implementing different rules for cut offs, so that candidates that are too bad are thrown out. For instance, there can be one cut off rule for the character candidates that is stored in each position of the segmentation graph. This could for instance be such that each position only can hold a fixed number of candidates or it can be based on differences in the character candidate distances, such that the number of candidates in each position is flexible for different positions in the table. Another cut off rule can be can be defined and applied on the candidate strings on each position of the recognition graph. These can also be based on a fixed number or based on the score of the string candidates. The cut off rules may to be tuned so that the system can work more effectively and produce better string candidates.

Exemplary Stroke Analysis Sequence

Figure 14:
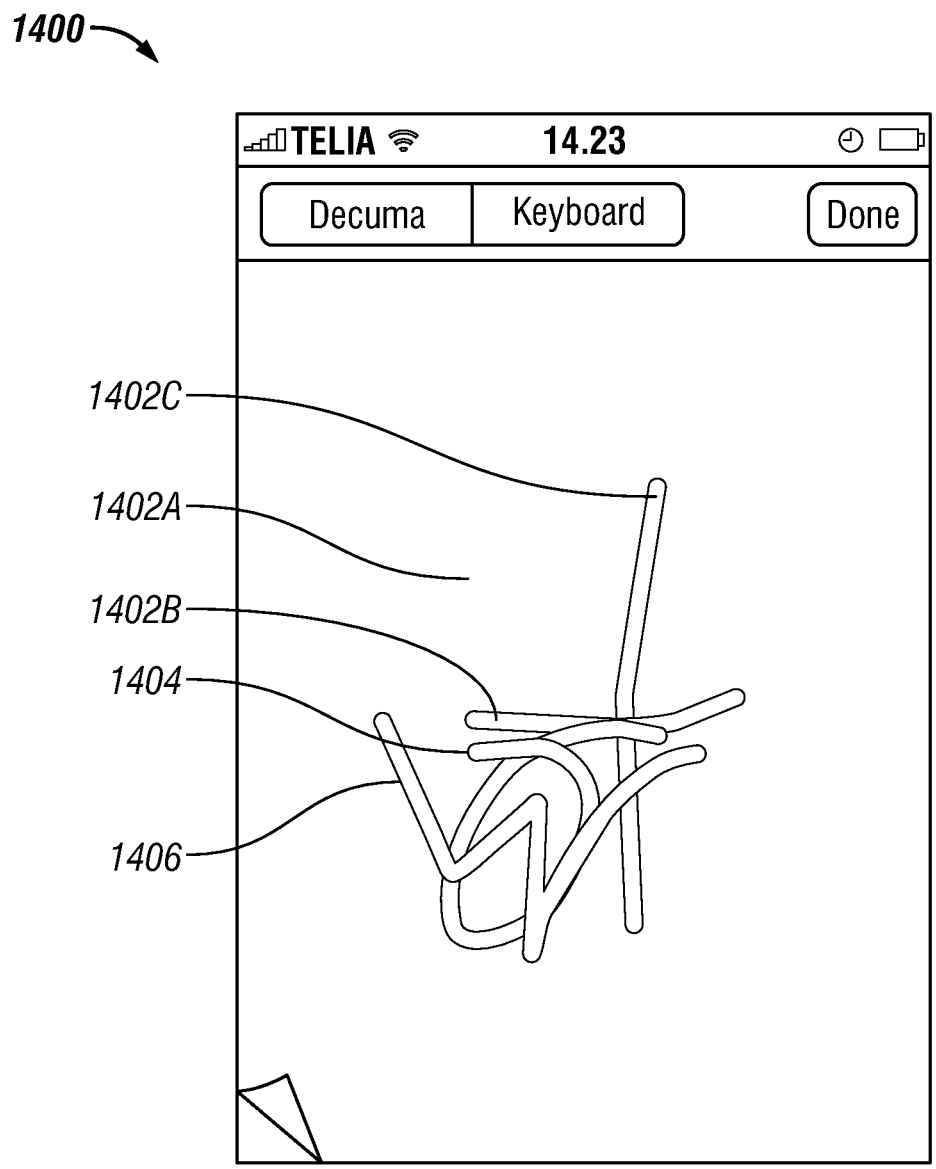
FIG. 14 shows exemplary stroke input.

FIGS. 14-16 illustrate a stroke analysis scenario and depict a screenshot of the input and the resulting segmentation recognition graphs. FIG. 14 depicts a snapshot of the screen after the characters "H-o-w" have been entered with on-top writing. The user has entered the "H" with three strokes 1402*a-c* and then the "o" with one stroke 1404 and a "w" with one stroke 1406. As can be seen on the different stages of the fading of the stroke traces, the enumeration of the strokes follow the input order. The first stroke of the "H", 1402*a*, can barely be seen as it has almost faded away completely.

FIG. 15 shows an example of a segmentation graph that can be created from the strokes 1402*a-c*, 1406 and 1408. In the first column of the first row (1, 1) of the table 1500, the character candidates can be found for the first stroke 1402*a* alone. Each candidate is presented within apostrophes and is followed with its associated candidate distance as calculated by 1304. In the second column of the second row (2, 1) the character candidates for the second stroke 1402*b* alone can be found. Furthermore in (3, 1) the candidates for the stroke 1402*c* are found and at position (4, 1) and (5, 1) the candidates for stroke 1404 and 1406 are found respectively.

In the second column of the second row (2, 2) of the table 1500 are the character candidates for the combination of strokes 1402*a* and 1402*b*. This example demonstrates that the two strokes together can be interpreted as a 't' with a distance of 272. In the third column of the second row (3, 2) of the table 1500 are the character candidates for the combination of strokes 1402*b* and 1402*c*. At the position (4, 2) are the candidates for strokes 1402*c* and 1404 combined and at position (5, 2) are the candidates for the combination of strokes 1404 and 1406.

The rest of the table follows the same pattern. For instance, in the fifth column of the fifth row there is no character candidate. This position corresponds to a combination of all the five strokes 1402*a-c*, 1404 and 1406. This is due to the effect of cut-off rules used in the example. The recognizer could not match the five strokes to any character of the character database with a distance that was good enough to escape the cut-off rules. The reduced number of character candidates at different other positions of the table 1500 also indicate that some cut-off rules have been in effect.

FIG. 16 shows an example of a recognition graph created from the strokes 1402*a-c*, 1406 and 1408 of FIG. 14 and the segmentation graph 1500 of FIG. 15. In the first column of the table 1600, four different string candidates be found. These are all taken from position (1, 1) of the segmentation graph 1500 and represent the stroke 1402*a*. The string candidates are presented inside quotation marks. One example is found at 1602. Next to the string candidate is its score, which includes two parts 1602-1604 in this example. The first number (1602), immediately to the right of the string, is the score calculated without reduction for linguistics. The second number (1604), to the right of the first number, is the same score but with reduction for linguistic significance.

In the second column of the recognition graph 1600, six string candidates be seen. These string candidates all represent the first two input strokes, 1402*a* and 1402*b*. The first five string candidates of the column are taken from the segmentation graph 1500 from position (2, 2) and the last string candidate is taken from appending one of the character candidates 'm' at position (2, 1) of the segmentation graph to one of the string candidates in the first column of the recognition graph, "I". Many more string candidates could be formed in the same way by appending character candidates from position (2, 2) of the segmentation graph with string candidates in column 1 of the recognition graph, and that has also been done by the algorithm in step 1308 of FIG. 13. But the process has then sorted these string candidates based on its scores including linguistic reduction and applied some cut-off rule to reduce the number of string candidate. That explains why only the top six of all the possible string candidates are shown in the column.

Following the same pattern, the third column contains string candidates that are either produced directly from the character candidates at position (3, 3) of the segmentation graph, or from any string candidate of column 1 of the recognition graph appended with any character candidate from position (3, 2) of the segmentation graph, or from any string candidate of column 2 of the recognition graph appended with any character candidate from the position (3, 1) of the segmentation graph. Three different examples are the string candidates "H", "It" and "fI" which are respectively created with no start string, a start string ("I") from the first column and a start string ("f") from the second column of the recognition graph 1600. The string candidates in column 3 all correspond to the three first strokes, 1402*a-c*.

The string candidates in the fourth and fifth column of the recognition graph 1600 follow the same production pattern as explained above.

As mentioned above, the table 1600 shows two scores are shown for each string candidate. The score before linguistic reduction, showed immediately to the right of the string candidate, only comes from the shape of the written strokes and can therefore be denoted as the shape score of the string candidate. The score including linguistic reduction, shown to the right of the shape score, is used in this example for sorting the string candidates in the ranked list of each column of the recognition graph. It can therefore be denoted as the sorting score of the string candidate.

In this example the shape score of each string candidate is created by the formula SS+C*NC+CD, where SS is the shape score of the start string, C is the appended character candidate distance, NC is the number of strokes in the appended character candidate and CD is a connection distance between the start string and the appended character candidate. The calculation of the connection distance can be done in different ways and is handled by the module 1310 of FIG. 13. If the string candidate does not have any start string, SS and CD in the formula above will both be zero. The shape score for single character string candidates in table 1600 is therefore just the character candidate distance multiplied with the number of strokes for that character candidate. This can be verified for instance by looking at the string candidate "H" in column 3 of the table 1600 which represents the three strokes 1402*a-c*. The shape score of the string candidate is 519 which equals 3*173, and it can be verified that the character candidate distance of 'H' at position (3, 3) of the segmentation graph 1500 is exactly 173.

The sorting score is in this example taken from the shape score as mentioned above and multiplying it with a factor between 0 and 1. The factor is depending on the output of the linguistic module 1314 which assesses the string's linguistic significance with the help of the linguistic database 112. When further appending character candidates to a string candidate, as can be seen by moving to the right in the table 1600, it is the shape score of the start string that is added upon to create the shape score of the new string candidate as explained above, and first after that is the linguistic reduction applied on the new string candidate. The effect of the linguistic reduction applied on the shape score to form the sorting score can be seen for example in column 5 of the recognition graph. The string candidate "flow" has a shape score of 1717 which is reduced to the sorting score 1207, since the string is assessed as a valid dictionary string. This can be compared to the string candidate "HOw" further down the list in the same column, which has a much better shape score of 1220 but is not considered linguistically valid and is therefore given no reduction, and its sorting score becomes the same value, 1220, which means that it will be ranked lower than "flow".

OTHER EMBODIMENTS

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

The invention claimed is:
1. A handwriting recognition apparatus, comprising:
 a processor programmed to perform operations comprising:
  receiving a series of multiple strokes via a touch sensitive screen, each stroke defined by a contact, trace, and lift of a stylus, finger, or other member;
  presenting each stroke on a display until occurrence of a prescribed event after which the displayed stroke disappears;

accumulating strokes into a buffer and interpreting all accumulated strokes collectively to identify multiple candidate strings that could potentially be represented by the accumulated strokes by:
  combining input strokes in different ways to produce alternative configurations;
  for each alternative configuration, comparing each stroke input with a character database to produce multiple character candidates and a character distance for each candidate; and
  concatenating said character candidates in different combinations to produce complete candidate strings, each comprising a potential representation of user-intended strokes from start to end; and
  producing a ranked and ordered list of the complete candidate strings according to a score of each candidate string, where scores are produced by weighing the distances of the concatenated characters and string likeliness such that strings that are more likely to represent the accumulated strokes are ranked higher and strings that are less likely to represent the accumulated strokes are ranked lower.

2. The apparatus of claim 1, further comprising:
for each alternative configuration, comparing stroke input with the character database to produce multiple character q candidates and a character distance for each candidate, wherein q is a positive integer greater than or equal to two.

3. The apparatus of claim 1, further comprising:
operating the display to present candidate strings for user selection, the candidate strings being displayed upon one of the following basis:
  (1) only after all strokes have disappeared,
  (2) only after receiving a predefined user submitted delimiter,
  (3) only after a predetermined delay has elapsed following user entry of a most recent stroke.

4. The apparatus claim 1, further comprising:
said character database representing predefined character shape data;
providing a linguistic database representing predefined character strings;
said accumulated strokes into a buffer and interpreting all accumulated strokes collectively against one of the following to identify multiple candidate strings that could potentially be represented by the accumulated strokes:
  the character database alone, the character database and the linguistic database.

5. The apparatus of claim 1, where said ranking is dependent upon string length such that long strings that have a given linguistic likelihood are promoted more than short strings of the given linguistic likelihood.

6. The apparatus of claim 1, where the prescribed event comprises expiration of a prescribed time period.

7. The apparatus of claim 6, responsive to user entry of multiple strokes within a length of time less than or equal to the prescribed time period, concurrently presenting all of the strokes in various stages of fading.

8. The apparatus of claim 6, where the predetermined delay is different than the prescribed time period.

9. The apparatus of claim 1, where the operation of presenting each stroke on the display until occurrence of a prescribed event after which the displayed stroke disappears comprises:
  making an area where the touch screen received the stroke visually distinct; and
  after a prescribed time period from entry of the stroke, fading and eventually removing the visually distinct area.

10. The apparatus of claim 1, where the prescribed event comprises user entry of a prescribed number of subsequent strokes.

11. The apparatus of claim 1, where the operation of presenting each stroke on the display until occurrence of a prescribed event after which the displayed stroke disappears comprises:
  responsive to user entry of a new stroke, incrementally fading each currently displayed stroke by a predetermined amount.

12. The apparatus of claim 1, where the received strokes form multiple characters and at least some of the characters substantially overlap each other.

13. A handwriting recognition method, comprising:
providing a processor programmed to perform operations comprising:
  receiving a series of multiple strokes via a touch sensitive screen, each stroke defined by a contact, trace, and lift of a stylus, finger, or other member;
  presenting each stroke on a display until occurrence of a prescribed event after which the displayed stroke disappears;
  accumulating strokes into a buffer and interpreting all accumulated strokes collectively to identify multiple candidate strings that could potentially be represented by the accumulated strokes by:
    combining input strokes in different ways to produce alternative configurations;
    for each alternative configuration, comparing each stroke input with a character database to produce multiple character candidates and a character distance for each candidate; and
    concatenating said character candidates in different combinations to produce complete candidate strings, each comprising a potential representation of user-intended strokes from start to end; and
    producing a ranked and ordered list of the complete candidate strings according to a score of each candidate string, where scores are produced by weighing the distances of the concatenated characters and string likeliness such that strings that are more likely to represent the accumulated strokes are ranked higher and strings that are less likely to represent the accumulated strokes are ranked lower.

14. The method of claim 13, further comprising:
for each alternative configuration, comparing stroke input with the character database to produce multiple character q candidates and a character distance for each candidate, wherein q is a positive integer greater than or equal to two.

15. The method of claim 13, further comprising:
operating the display to present candidate strings for user selection, the candidate strings being displayed upon one of the following basis:
  (1) only after all strokes have disappeared,
  (2) only after receiving a predefined user submitted delimiter,
  (3) only after a predetermined delay has elapsed following user entry of a most recent stroke.

16. The method claim 13, further comprising:
with said character database representing predefined character shape data;
providing a linguistic database representing predefined character strings;

said accumulating strokes into a buffer and interpreting all accumulated strokes collectively against one of the following to identify multiple candidate strings that could potentially be represented by the accumulated strokes: the character database alone, the character database and the linguistic database.

17. The method of claim 13, where said ranking is dependent upon string length such that long strings that have a given linguistic likelihood are promoted more than short strings of the given linguistic likelihood.

18. The method of claim 13, where the prescribed event comprises expiration of a prescribed time period.

19. The method of claim 18, responsive to user entry of multiple strokes within a length of time less than or equal to the prescribed time period, concurrently presenting all of the strokes in various stages of fading.

20. The method of claim 18, where the predetermined delay is different than the prescribed time period.

21. The method of claim 13, where the operation of presenting each stroke on the display until occurrence of a prescribed event after which the displayed stroke disappears comprises:

making an area where the touch screen received the stroke visually distinct; and after a prescribed time period from entry of the stroke, fading and eventually removing the visually distinct area.

22. The method of claim 13, where the prescribed event comprises user entry of a prescribed number of subsequent strokes.

23. The method of claim 13, where the operation of presenting each stroke on the display until occurrence of a prescribed event after which the displayed stroke disappears comprises:

responsive to user entry of a new stroke, incrementally fading each currently displayed stroke by a predetermined amount.

24. The method of claim 13, where the received strokes form multiple characters and at least some of the characters substantially overlap each other.

* * * * *